US012077054B2

(12) United States Patent
Tabatowski-Bush et al.

(10) Patent No.: US 12,077,054 B2
(45) Date of Patent: Sep. 3, 2024

(54) VEHICLE MAIN CONTACTOR WELD DETECTION SYSTEM

(71) Applicant: Ford Global Technologies, LLC, Dearborn, MI (US)

(72) Inventors: Benjamin A. Tabatowski-Bush, Ann Arbor, MI (US); Wesley Edward Burkman, Dearborn, MI (US); Baojin Wang, Saline, MI (US); John Paul Gibeau, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 577 days.

(21) Appl. No.: 17/331,836

(22) Filed: May 27, 2021

(65) Prior Publication Data

US 2022/0379729 A1 Dec. 1, 2022

(51) Int. Cl.
*B60L 3/00* (2019.01)
*B60L 3/04* (2006.01)
*B60L 3/12* (2006.01)

(52) U.S. Cl.
CPC ............. *B60L 3/0046* (2013.01); *B60L 3/04* (2013.01); *B60L 3/12* (2013.01)

(58) Field of Classification Search
CPC .. B60L 3/0046; B60L 3/04; B60L 3/12; B60L 3/0023; B60L 15/22; B60L 2260/44; Y02T 10/70
USPC ........................................................ 320/136
See application file for complete search history.

(56) References Cited

U.S. PATENT DOCUMENTS

| | | | |
|---|---|---|---|
| 8,901,934 B2 | 12/2014 | Namou et al. | |
| 9,047,648 B1 * | 6/2015 | Lekutai | G16H 40/40 |
| 9,260,015 B2 * | 2/2016 | Gonzales | B60L 3/12 |
| 9,500,691 B2 * | 11/2016 | Yun | G01R 31/006 |
| 9,513,681 B2 * | 12/2016 | Wang | H02M 7/2176 |
| 9,796,288 B2 * | 10/2017 | Mensah-Brown | H02J 7/34 |
| 10,516,189 B2 * | 12/2019 | Loftus | H01M 10/44 |
| 10,639,998 B2 * | 5/2020 | Sturza | B60L 3/0023 |
| 10,967,754 B2 * | 4/2021 | Tabatowski-Bush | B60L 3/0023 |
| 11,299,056 B2 * | 4/2022 | Wang | G01R 31/3278 |
| 11,592,485 B2 * | 2/2023 | Azidehak | B60R 16/02 |
| 2010/0084920 A1 * | 4/2010 | Banting | G01R 15/142 307/104 |
| 2014/0097797 A1 * | 4/2014 | Hendrix | H01M 10/4207 320/118 |
| 2016/0091551 A1 * | 3/2016 | Sun | B60L 53/14 701/34.2 |
| 2016/0129829 A1 * | 5/2016 | Yun | G01R 31/66 315/77 |
| 2018/0134169 A1 | 5/2018 | Loftus et al. | |
| 2018/0272870 A1 * | 9/2018 | Burkman | H02H 9/001 |

(Continued)

FOREIGN PATENT DOCUMENTS

KR 100397565 B1 * 9/2003 ............... H02H 7/09

*Primary Examiner* — M Baye Diao
(74) *Attorney, Agent, or Firm* — David B. Kelley; Brooks Kushman P.C.

(57) ABSTRACT

A vehicle includes a controller that, responsive to data indicating a voltage associated with an inrush current through a main contactor exceeds a first threshold, commands the main contactor to open and inhibits the vehicle from being driven, and responsive to data indicating the voltage exceeds a second threshold less than the first threshold, commands the main contactor to sequentially open and then close.

13 Claims, 4 Drawing Sheets

(56) References Cited

U.S. PATENT DOCUMENTS

| | | | |
|---|---|---|---|
| 2020/0290461 A1* | 9/2020 | Lu ............................. | B60L 3/12 |
| 2021/0170899 A1* | 6/2021 | Wang ........................ | B60L 3/04 |
| 2022/0126711 A1* | 4/2022 | Mackenzie ............. | B60L 53/12 |
| 2022/0219542 A1* | 7/2022 | Wang ................. | G01R 31/3275 |

\* cited by examiner

VEHICLE MAIN CONTACTOR WELD DETECTION SYSTEM

TECHNICAL FIELD

The present disclosure relates to a system for detecting a contactor weld for an electrified vehicle.

BACKGROUND

Electric vehicles are propelled by electric energy stored in vehicle batteries via switches and contactors. Contactor welding may occur when a large electric current flows through the contactor causing the contactor to remain at a closed position.

SUMMARY

A vehicle includes a traction battery, an electric machine, a main contactor electrically connected between the traction battery and the electric machine, and a controller. The controller, responsive to data indicating a voltage associated with an inrush current through the main contactor exceeds a first threshold, commands the main contactor to open and inhibit the vehicle from being driven. The controller also, responsive to data indicating the voltage exceeds a second threshold less than the first threshold, commands the main contactor to sequentially open and then close.

A method for a vehicle includes, after indication that a magnitude of inrush current through a main contactor that electrically connects a traction battery to an electric machine exceeds a threshold, commanding the main contactor to sequentially open and then close.

A power system for a vehicle includes a controller that commands a main contactor that electrically connects a traction battery with an electric machine to sequentially open and then close according to a sensed inrush current through the main contactor.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure, among other things, proposes a system and method for detecting contactor welds for an electrified vehicle.

Figure 1:
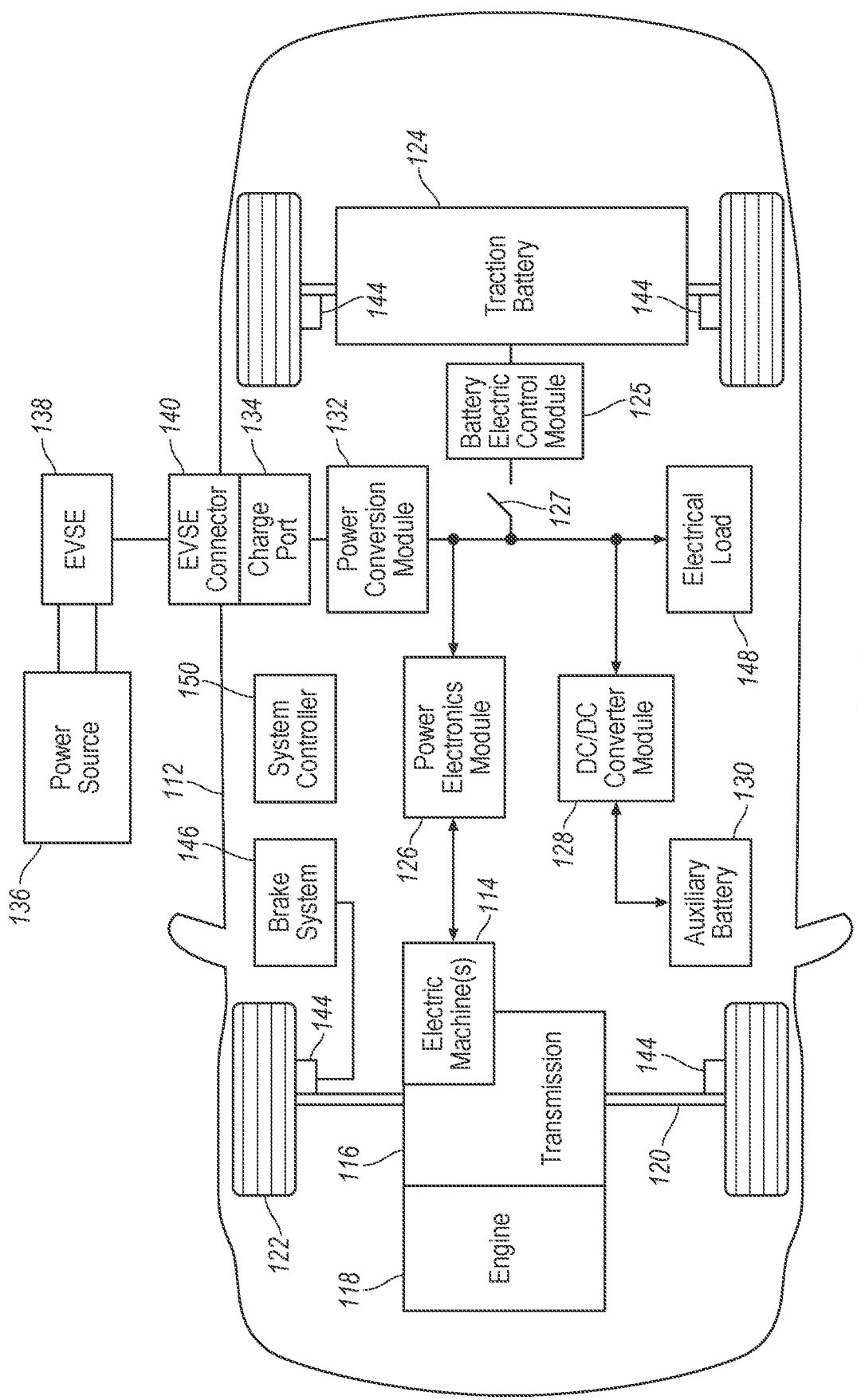
FIG. 1 illustrates an example block topology of an electrified vehicle illustrating drivetrain and energy storage components.

FIG. 1 illustrates a plug-in hybrid-electric vehicle (PHEV). A plug-in hybrid-electric vehicle 112 may comprise one or more electric machines (electric motors) 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 may provide propulsion and deceleration capability when the engine 118 is turned on or off. The electric machines 114 may also act as generators and may provide fuel economy benefits by recovering energy that would be lost as heat in the friction braking system. The electric machines 114 may also reduce vehicle emissions by allowing the engine 118 to operate at more efficient speeds and allowing the hybrid-electric vehicle 112 to be operated in electric mode with the engine 118 off under certain conditions.

A traction battery or battery pack 124 stores energy that may be used by the electric machines 114. A vehicle battery pack 124 may provide a high voltage DC output. The traction battery 124 may be electrically coupled to one or more battery electric control modules (BECM) 125. The BECM 125 may be provided with one or more processors and software applications configured to monitor and control various operations of the traction battery 124. The traction battery 124 may be further electrically coupled to one or more power electronics modules 126. The power electronics module 126 may also be referred to as a power inverter. One or more contactors 127 may isolate the traction battery 124 and the BECM 125 from other components when opened and couple the traction battery 124 and the BECM 25 to other components when closed. The power electronics module 126 may also be electrically coupled to the electric machines 114 and provide the ability to bi-directionally transfer energy between the traction battery 124 and the electric machines 114. For example, a traction battery 124 may provide a DC voltage while the electric machines 114 may operate using a three-phase AC current. The power electronics module 126 may convert the DC voltage to a three-phase AC current for use by the electric machines 114. In a regenerative mode, the power electronics module 126 may convert the three-phase AC current from the electric machines 114 acting as generators to the DC voltage compatible with the traction battery 124. The description herein is equally applicable to a pure electric vehicle. For a pure electric vehicle, the hybrid transmission 116 may be a gear box connected to the electric machine 114 and the engine 118 may not be present.

In addition to providing energy for propulsion, the traction battery 124 may provide energy for other vehicle electrical systems. A vehicle may include a DC/DC converter module 128 that converts the high voltage DC output of the traction battery 124 to a low voltage DC supply that is compatible with other low-voltage vehicle loads. An output of the DC/DC converter module 128 may be electrically coupled to an auxiliary battery 130 (e.g., 12V battery).

The vehicle 112 may be a battery electric vehicle (BEV) or a plug-in hybrid electric vehicle (PHEV) in which the traction battery 124 may be recharged by an external power source 136. The external power source 136 may be a connection to an electrical outlet. The external power source 136 may be an electrical power distribution network or grid as provided by an electric utility company. The external power source 136 may be electrically coupled to electric vehicle supply equipment (EVSE) 138. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 146. The brake system 146 may include other components to operate the wheel brakes 144. For simplicity, the figure depicts a single connection between the brake system 146 and one of the wheel brakes 144. A connection between the brake system 146 and the other wheel brakes 144 is implied. The brake system 146 may include a controller to monitor and coordinate the brake system 146. The brake system 146 may monitor the brake components and control the wheel brakes 144 for vehicle deceleration. The brake system 146 may respond to driver commands and may also operate autonomously to implement features such as stability control. The controller of the brake system 146 may implement a method of applying a requested brake force when requested by another controller or sub-function.

One or more electrical loads 146 may be coupled to the high-voltage bus. The electrical loads 146 may have an associated controller that operates and controls the electrical loads 146 when appropriate. Examples of electrical loads 146 may be a heating module, an air-conditioning module or the like.

The various components discussed may have one or more associated controllers to control and monitor the operation of the components. The controllers may communicate via a serial bus (e.g., Controller Area Network (CAN)) or via discrete conductors. A system controller 150 may be present to coordinate the operation of the various components.

Figure 2:
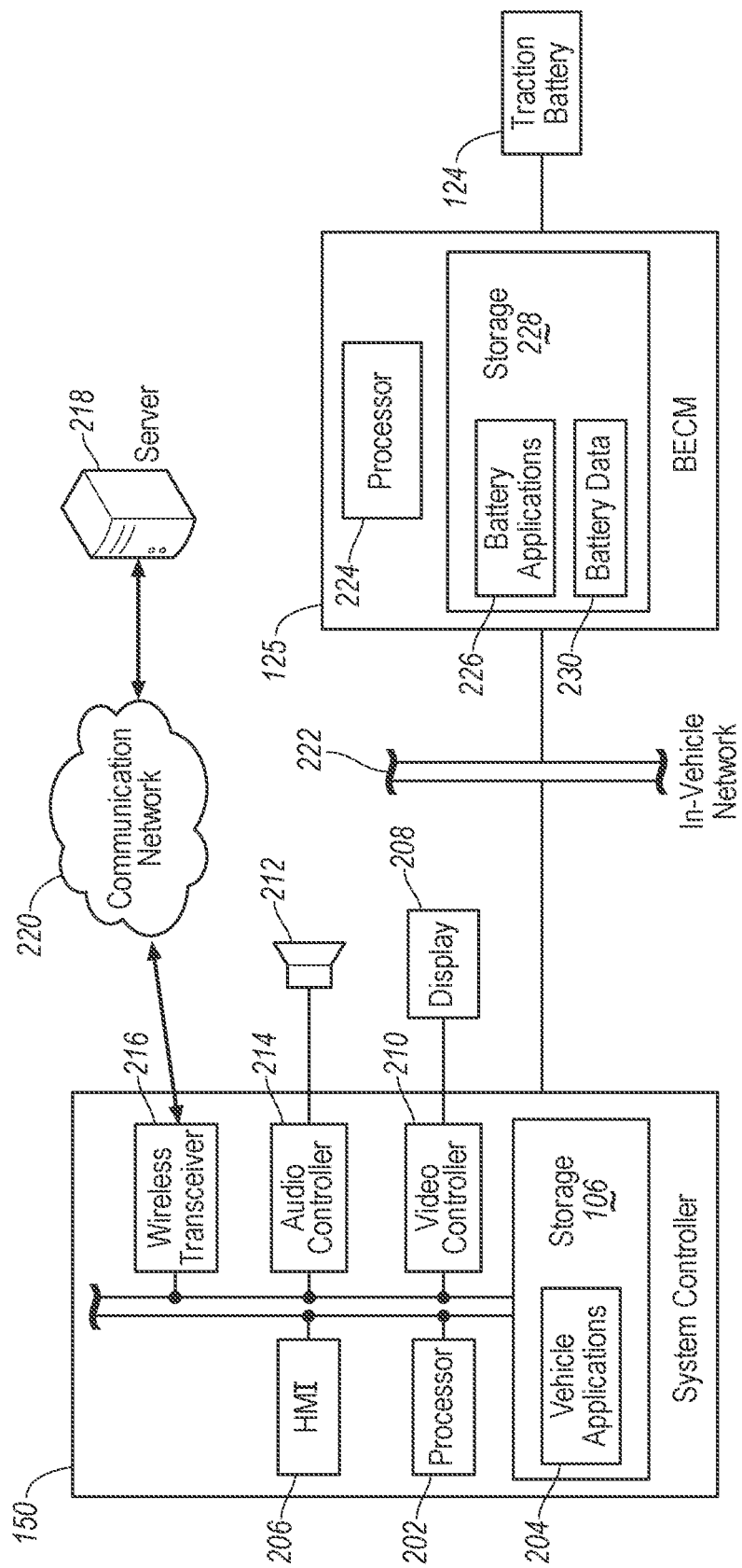
FIG. 2 illustrates an example diagram of a system controller and a battery electric control module.

Referring to FIG. 2, an example diagram for a battery control system including the system controller 150 and the BECM 125 is illustrated. The system controller 150 may include one or more processors 202 configured to perform instructions, commands, and other routines in support of the processes described herein. For instance, the system controller 150 may be configured to execute instructions of vehicle applications 204 to provide features such as navigation, satellite radio decoding, and vehicle power management. Such instructions and other data may be maintained in a non-volatile manner using a variety of types of computer-readable storage medium 206. The computer-readable medium 206 (also referred to as a processor-readable medium or storage) includes any non-transitory medium (e.g., tangible medium) that participates in providing instructions or other data that may be read by the processor 202 of the system controller 150. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

The system controller 150 may be provided with various features allowing the vehicle occupants/users to interface with the system controller 150. For example, the system controller 150 may receive input from human-machine interface (HMI) controls 206 configured to provide for occupant interaction with the vehicle 112. As an example, the system controller 150 may interface with one or more buttons (not shown) or other HMI controls configured to invoke functions on the system controller 150 (e.g., steering wheel audio buttons, a push-to-talk button, instrument panel controls, etc.). The system controller 150 may also drive or otherwise communicate with one or more displays 208 configured to provide visual output to vehicle occupants by way of a video controller 210. In some cases, the display 208 may be a touch screen further configured to receive user touch input via the video controller 210, while in other cases the display 208 may be a display only, without touch input capabilities. The system controller 150 may also drive or otherwise communicate with one or more speakers 212 configured to provide audio output to vehicle occupants by way of an audio controller 214.

The system controller 150 may be further provided with a wireless transceiver 216 configured to communicate with a remote server 218 via a communication network 220. The wireless transceiver 216 may be configured to support a variety of communication protocols including but not limited to Wi-Fi, Bluetooth, radio-frequency identification (RFID), near-field communication (NFC), Zigbee, ultra-wide band (UWB), cellular or the like. The system controller 150 may be configured to receive commands from the remote server 218 operated by a vehicle manufacturer or an associated party to perform various operations to the vehicle 112. For instance, the system controller 150 may receive a command to perform a battery contactor weld test from the server 218 via the wireless transceiver 216. In response, the system controller 150 may proceed with the test by transferring the command to the BECM 125 via an in-vehicle network 222. Responsive to the conclusion of the weld test, the system controller 150 may obtain the test result from the BECM 125 and transmit the result to the remote server 218 via the wireless transceiver 216. The in-vehicle network 222 connecting the system controller 150 and the BECM 125 may include, but not be limited to, one or more of a CAN, an Ethernet network, or a media oriented system transport (MOST).

The BECM 125 may include a processor 224 configured to perform instructions, commands, and other routines in support of the processes described herein. For instance, the BECM 125 may be configured to execute instructions of battery application 226 to provide features such as charging, discharging, contactor weld test or the like. Such instructions and other data may be maintained in a non-volatile manner using a variety of types of computer-readable storage medium 228. Data log (e.g. test results) may be maintained in the storage 228 as a part of battery data 230.

Figure 3:
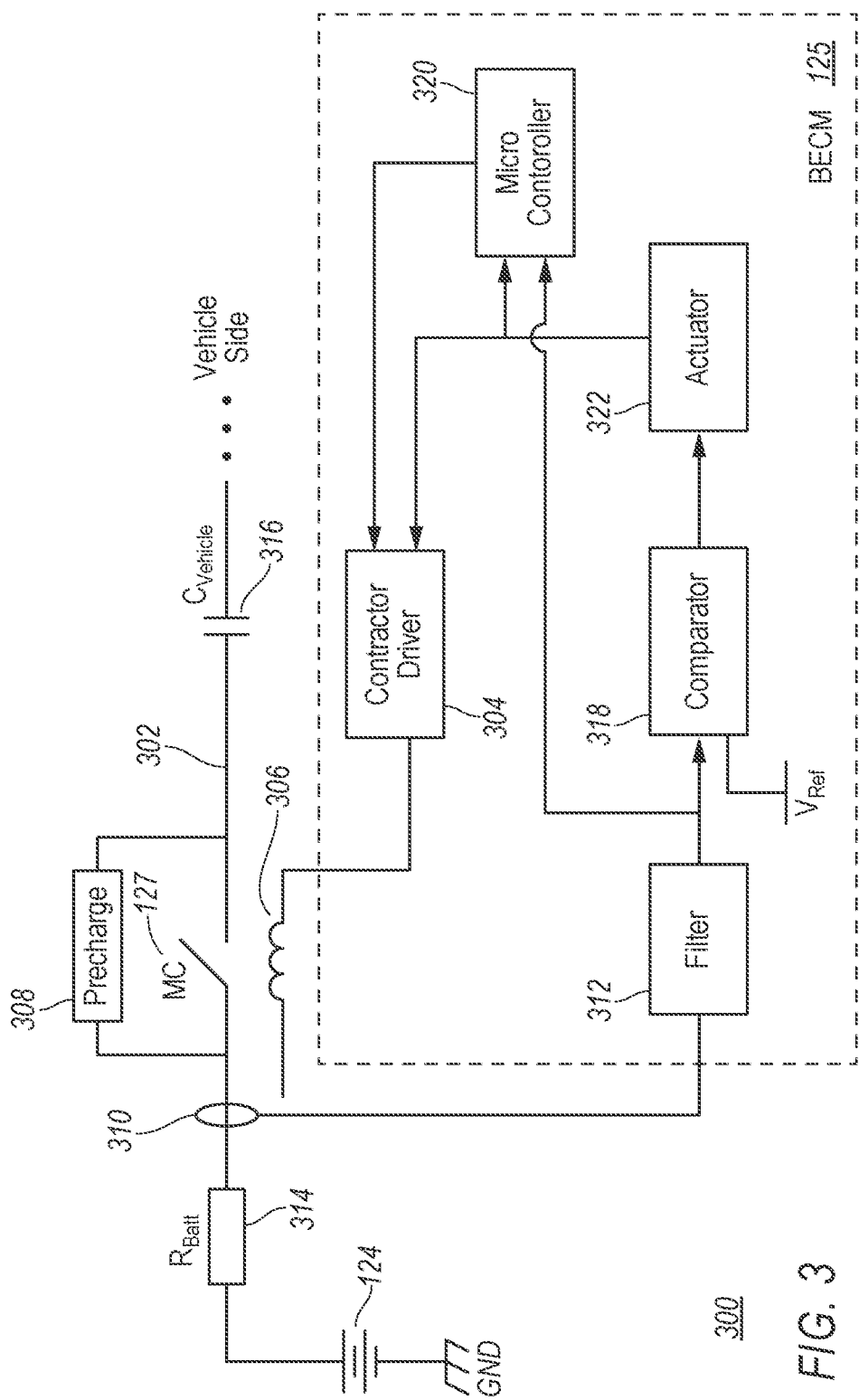
FIG. 3 illustrates an example circuit diagram of a contactor weld detecting circuit.

Referring to FIG. 3, an example circuit diagram of a battery contactor weld detection circuit 300 of one embodiment of the present disclosure is illustrated. With continuing reference to FIGS. 1 and 2, in the present example, the contactor weld detection circuit 300 may be integrated into the BECM 125, although all or part of the circuit 300 may implemented separately in other examples. As discussed above, one or more main contactors 127 may be connected between the vehicle 112 and the traction battery 127. The main contactor 127 may be disposed on a high-voltage (HV) bus/rail 302 of the vehicle. It is noted that although only one HV bus 302 and main contactor 207 are illustrated in FIG. 3, the vehicle 112 may include positive and negative HV buses 302 and the one or more main contactors may be disposed on either or both of the positive and negative buses 302. The main contactors 127 may be implemented in various types. As an example, the main contactor 127 may be of a magnetic contactor type influenced by a low power/low voltage (LV) contactor driver circuit 304 controlled by the BECM 125. The main contactor 127 may be spring loaded. In an inactive condition, the spring may apply a tension between a contactor core (not shown) and a contactor coil (not shown) urging the contactor to open so the electricity cannot flow through. The core and coil may be referred to as the first and second terminal of the contactor. Responsive to the low power driver circuit 304 being activated by the BECM 125, electricity flows through an electric coil 306 which generates a magnetic field overwhelming the spring tension so that the core contacts the coil and the main contactor 127 is closed. To open the contactor 127, the BECM 125 may deactivate the driver circuit 304 such that the magnetic field disappears and spring tension may urge the terminals to separate which opens the contactor 127.

A precharge circuit 308 may be disposed on either or both of the positive and negative HV buses 302. In the present example, as illustrated in FIG. 3, the precharge circuit 308 is disposed on the same HV bus 302 connected in parallel with the main contactor 127. The precharge circuit 308 may include a precharge resistor (not shown) and a precharge contactor (not shown) connected in series. When the main contactor 127 is open (i.e. the battery 127 is disconnected from the vehicle 112), there may be significant voltage difference on the HV bus 302 between the two terminals of the main contactor 127. If the main contactor 127 closes under this condition, a large inrush current may flow through the main contactor 127 due to the high voltage difference. As known in the art, inrush current is the maximal instantaneous input current drawn when first activated. As such, large inrush current may create heat. In addition, an electrical arc may be created during the closing process between contactor terminals as they move closer to each other. The heat and electrical arc may cause the contactor terminals to melt and weld together. To prevent the contactor weld, the precharge circuit 308 may be activated to precharge the HV bus 302 to reduce the voltage difference across the two terminals of the main contactor 127. Responsive to the voltage difference dropping below a predefined threshold (e.g. 10V), the main contactor 127 may close.

A current sensor 310 may be disposed on the HV bus 302 and configured to measure the inrush current when the main contactor 127 closes. The measured current signal may be sent to a low pass filter 312 configured to filter out the noise. Since the inrush current occurs in a very short period of time (e.g. in a few micro seconds), the current sensor 310 and the filter 312 may be configured to support a high bandwidth to provide an accurate measurement. As an example, the bandwidth of −3 dB low pass filter may be calculated using the following equation:

$$\text{Bandwidth} = 0.35/\tau \quad (1)$$

For instance, for a current sensor having 10 kHz bandwidth, the rise time $\tau$ is 35 μs. The rise time $\tau$ is representative of a RC time constant to charge and discharge a capacitor through a resistor of a circuit. The rise time $\tau$ may be calculated using the following equation:

$$\tau = RC \quad (2)$$

As illustrated in FIG. 3, a battery resistor $R_{Batt}$ 314, representative of a resistance on the battery side, is connected to the main contactor 127 on the battery side and a vehicle capacitor $C_{Vehicle}$ (link capacitor) 316, representative of a capacitance on the vehicle side, is connected to the main contactor 127 on the vehicle side. As an example, if the battery resistor $R_{Batt}$ has a value of 20 mΩ and the vehicle capacitor has a value of 1000 μF, the rise time $\tau$ will be 20 μs. Therefore, the bandwidth of the current sensor 310 should be at least 17.5 kHz to be able to capture the inrush current. The filter 312 may be configured to support at least the bandwidth of the sensor 310 to be able to filter out the noise. In some cases, the filter 312 may be configured to support a higher bandwidth such as 20 kHz following the above example.

The filter 312 may output a filtered current to a voltage comparator 318 and a micro controller 320 for processing. The micro controller 320 may be implemented via the processor 224 of the BECM 125. The current signal measured by the current sensor 310 may be in the form of a voltage within a predefined range that corresponds to a current measurement. For instance, if the sensor 310 is configured to support a 0-5V voltage and 0-2,000 A current measurement, the voltage and current value within each respective range may be generally proportional. A 5V voltage measurement may correspond to a 2,000 A current measurement, and a 2.5V voltage measurement may correspond to a 1,000 A current measurement. The filtered current may be output to the voltage comparator 318 to compare against a reference voltage (e.g. 4.8V) to determine if the current and voltage are too high. For instance, the 4.8V reference voltage corresponds to 1,920 A current. Responsive to determining the current on the HV bus 302 measured by the sensor 310 being above the threshold (i.e. 1,920 A corresponding to a 4.8V reference voltage), the comparator 318 outputs a signal to an actuator 322 to set a fault flag. The actuator 322 may be implemented via a flip/flop or latch switch in communication with the contactor driver 304 and the micro controller 320. Responsive to receiving the signal from the comparator 318, the actuator 322 may output an actuation signal to the contactor driver 304 to deactivate electric coil 306 and open the main contactor 127. The actuation signal may be also fed to the micro controller 320 for recordation. As discussed above, the micro controller 320 may further receive the current signal from the filter 312 for analysis. In general, the micro controller may be configured to support an analog/digital (A/D) sampling rate that is double of the bandwidth of the filter 312. Continuing with the above example in which the filter 312 has a bandwidth of 20 kHz, the A/D sampling rate of the micro controller will be 40 kHz. The micro controller samples the current signal and converts the analog signal into digital form for recordation and processing. The micro controller may compare the digital signal with a predefined current threshold (e.g.

1000 A) that is less than the threshold of the comparator 318. A time threshold may be further used for contactor weld detections. For instance, responsive to determining the current is above the current threshold longer than the time threshold. the micro controller 320 may command the contactor driver 304 to disconnect the main contactor 127. The micro controller 320 may further report the detections to the server 218 via the wireless transceiver 216.

Figure 4:
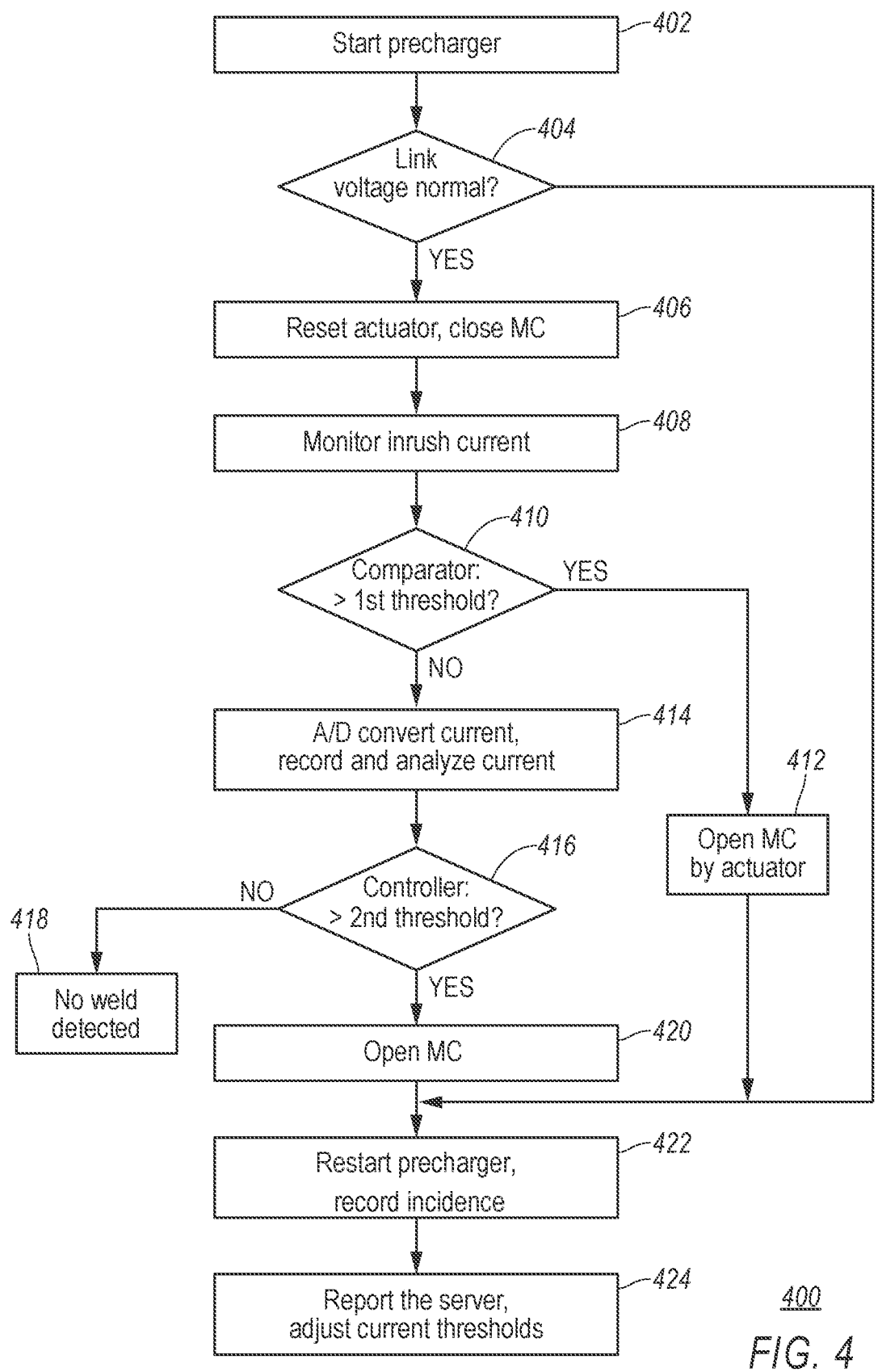
FIG. 4 illustrates an example flow diagram for contactor weld detection.

Referring to FIG. 4, an example flow diagram for a contactor weld detecting process 400 is illustrated. With continuing reference to FIGS. 1-3, the process 400 may be implemented via the BECM 125 individually or in combination with other components of the vehicle 112. At operation 402, responsive to receiving a command indicative of a user intending to start to use the vehicle 112, the BECM 125 starts the precharge process by closing the precharge contactor of the precharge circuit 308 such that the link voltage on the vehicle side will rise. The link voltage may be monitored in various ways. For instance, a voltage sensor (not shown) may be disposed on the vehicle side of the HV bus. Additionally or alternatively, the BECM 125 may measure the link voltage by signals from other components/controllers of the vehicle 112. At operation 404, responsive to detecting the link voltage is within a predetermined threshold from the battery voltage (e.g. within 20V), the process proceeds to operation 406 and the BECM 125 resets the actuator 322 and closes the main contactor 127. At operation 408, the BECM 125 monitors the inrush current on the HV bus 302 via the current sensor 310 and provides the inrush current to the comparator 318 and micro controller 320 through the filter 312. At operation 410, the BECM 125 verifies that the comparator 410 outputs a signal indicative of the inrush current being greater than a first predetermined current threshold (e.g. 1,920 A). If the answer is a yes which is indicative of a high possibility of contactor weld, the process proceeds to operation 412 and the actuator sends a signal to the contactor driver to open the main contactor 127. Additionally, the BECM 125 may prohibit the re-closing of the main contactor until the next key cycle. In case that the contactor weld has happened, the driver circuit 304 may be unable to open the main contactor 127 and therefore additional measures may be taken. For instance, the BECM 125 may send a message to the system controller 150 to prohibit the vehicle from being driven even though the battery is connected to the HV bus 302. Alternatively, the system controller 150 may be configured to only allow the vehicle to be driven when the battery SOC is below a predefined threshold (e.g. 80%) to prevent overcharging.

Otherwise, if the current is not above the first current threshold, the process proceeds from operation 410 to operation 414 and the micro controller 320 performs an A/D conversion to the current signal. Once converted to digital form, the current signal may be recorded as a part of battery data 230 and analyzed by the micro controller 320. At operation 416, if the micro controller 320 determines the current on the HV bus 302 is below a predefined second current threshold (e.g. 1,000 A), the process proceeds to operation 418 and indicates no contactor weld is detected. Otherwise, if the micro controller 320 determines that the current is above the second current threshold for a period of time longer than a time threshold (e.g. 20 µs) indicative of moderate possibility of contactor weld, the process proceeds to operation 420 to perform a quick reset, such as open and re-close the main contactor to verify if a weld has occurred. At operation 422, the BECM 125 performs one or more verification processes such as restarting the precharge process, and/or enters a mode in which vehicle operation is prohibited until the situation has been further examined. As an example, if the process reaches operation 422 from operations 404 or 420, the BECM 125 may allow the restart precharge process one more time. If the process reaches operation 422 from operation 412, the BECM 125 may enter into the mode. At operation 424, the BECM 125 may record the current data and controller operations, and report the data to the server 218 for further analysis. Since all vehicles are different, a single current threshold may not accurately reflect the specific condition of each specific vehicle. The BECM 125 may be configured to adapt to the specific condition of the vehicle by adjusting the first and second current threshold to provide a more accurate contactor weld detection. For instance, if comparator detection at operation 410 is false and the main contactor 127 opens under the control of the driver circuit 304, the BECM 125 may record and send the false detection to the server 218 for further analysis. The server 218 may send an update to the BECM 125 to modify the reference voltage of the comparator 318 such that the first predetermined current threshold may be modified accordingly. Additionally, if the fault detection repeats over time, the BECM 125 may automatically lower the reference voltage of the comparator 318 to lower the current threshold and reduce the chance of further false detections. Similarly, the server 218 may send updates to the BECM 125 to modify a second current threshold (increase or decrease) based on the design need. If false contactor weld detections repeatedly occur, the BECM 125 may automatically lower the second current threshold The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read only memory devices and information alterably stored on writeable storage media such as compact discs, random access memory devices, and other magnetic and optical media. The processes, methods, or algorithms can also be implemented in a software executable object. Alternatively, the processes, methods, or algorithms can be embodied in whole or in part using suitable hardware components, such as application specific integrated circuits, field-programmable gate arrays, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a traction battery;
   an electric machine;
   a main contactor electrically connected between the traction battery and the electric machine; and
   a controller programmed to,
      responsive to data indicating a voltage associated with an inrush current through the main contactor exceeds a first threshold, command the main contactor to open and inhibit the vehicle from being driven, and
      responsive to data indicating the voltage exceeds a second threshold less than the first threshold, command the main contactor to sequentially open and then close.

2. The vehicle of claim 1, wherein the controller is further programmed to, responsive to the main contactor opening following the command to open the main contactor and inhibit the vehicle from being driven, decrease the first threshold.

3. The vehicle of claim 1 wherein the controller is further programmed to, responsive to the main contactor opening following the command to sequentially open and then close the main contactor, decrease the second current threshold.

4. The vehicle of claim 1, wherein the controller is further programmed to, responsive to the data indicating the voltage exceeds the first threshold, record the data and report the data to a remote server via a wireless connection.

5. A method for a vehicle comprising:
   after indication that a magnitude of inrush current through a main contactor that electrically connects a traction battery to an electric machine exceeds a threshold, commanding the main contactor to sequentially open and then close; and
   after indication that a magnitude of inrush current through the main contactor exceeds another threshold greater than the threshold, commanding the main contactor to open and inhibiting the vehicle from being driven.

6. The method of claim 5 further comprising, after the main contactor opens following the indication that the magnitude exceeds the another threshold and the corresponding commanding, decreasing the another threshold.

7. The method of claim 5 further comprising, after indication that a magnitude of inrush current through the main contactor exceeds another threshold greater than the threshold and a state of charge of the traction battery is greater than a limit value, commanding the main contactor to open and inhibiting the vehicle from being driven.

8. The method of claim 7 further comprising, after the main contactor opens following the indication that the magnitude exceeds the another threshold and the corresponding commanding, decreasing the another threshold.

9. The method of claim 5 further comprising, after the main contactor opens following the commanding, decreasing the threshold.

10. The method of claim 5 further comprising recording and reporting data associated with the indication via a wireless connection.

11. A power system for a vehicle comprising:
    a controller programmed to command a main contactor that electrically connects a traction battery with an electric machine to sequentially open and then close according to a sensed inrush current through the main contactor, and selectively inhibit operation of the vehicle according to the sensed inrush current.

12. The power system of claim 11, wherein the controller is further programmed to selectively inhibit operation of the vehicle according to a state of charge of the traction battery.

13. The power system of claim 11, wherein the controller is further programmed to report data associated with the inrush current via a wireless connection.

* * * * *